(12) United States Patent
Gustafsson et al.

(10) Patent No.: US 11,437,166 B2
(45) Date of Patent: Sep. 6, 2022

(54) HVDC POWER CABLE WITH WATER-BLOCKING CAPABILITY

(71) Applicant: NKT HV Cables AB, Lyckeby (SE)

(72) Inventors: Kristian Gustafsson, Karlskrona (SE); Amirhossein Abbasi, Lyckeby (SE); Tommy Johansson, Bräkne-Hoby (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 17/595,199

(22) PCT Filed: May 20, 2020

(86) PCT No.: PCT/EP2020/064139
§ 371 (c)(1),
(2) Date: Nov. 11, 2021

(87) PCT Pub. No.: WO2020/234391
PCT Pub. Date: Nov. 26, 2020

(65) Prior Publication Data
US 2022/0208416 A1    Jun. 30, 2022

(30) Foreign Application Priority Data
May 20, 2019    (EP) .................................. 19175461

(51) Int. Cl.
*H01B 7/288* (2006.01)
*H01B 7/14* (2006.01)

(52) U.S. Cl.
CPC ............... *H01B 7/288* (2013.01); *H01B 7/14* (2013.01)

(58) Field of Classification Search
CPC ........ H01B 7/288; H01B 7/285; H01B 7/282; H01B 7/28; H01B 7/14; H01B 7/145; H01B 13/32; H01B 13/322
See application file for complete search history.

(56) References Cited

U.S. PATENT DOCUMENTS

| | | | | |
|---|---|---|---|---|
| 4,095,039 | A | * | 6/1978 | Thompson ............. H01B 7/285 174/23 C |
| 4,130,450 | A | | 12/1978 | Bahder et al. |
| 4,360,704 | A | * | 11/1982 | Madry ................. H01B 7/2825 174/23 R |

(Continued)

FOREIGN PATENT DOCUMENTS

| | | |
|---|---|---|
| WO | 9636054 A1 | 11/1996 |
| WO | 2016206715 A1 | 12/2016 |

OTHER PUBLICATIONS

Extended European Search Report; Application No. 19175461.3; Completed: Sep. 18, 2019; dated Sep. 25, 2019; 8 Pages.

(Continued)

*Primary Examiner* — Hoa C Nguyen
*Assistant Examiner* — Amol H Patel
(74) *Attorney, Agent, or Firm* — Whitmyer IP Group LLC

(57) ABSTRACT

A high voltage DC power cable designed for voltages of 320 kV or higher, including: a multi-wire conductor, an inner semiconducting layer arranged around the multi-wire conductor, the inner semiconducting layer forming a screen layer for the multi-wire conductor, a solid insulation system arranged around the inner semiconducting layer, and a water-blocking compound configured to restrict water migration into the high voltage DC power cable.

17 Claims, 2 Drawing Sheets

(56) References Cited

U.S. PATENT DOCUMENTS

| | | | | |
|---|---|---|---|---|
| 4,703,132 | A | * | 10/1987 | Marciano-Agostinelli ................... H01B 13/321 174/23 C |
| 4,963,695 | A | * | 10/1990 | Marciano-Agostinelli ................... B29C 48/06 156/48 |
| 5,010,209 | A | * | 4/1991 | Marciano-Agostinelli ................... H01B 9/02 174/23 C |
| 5,049,593 | A | * | 9/1991 | Marciano-Agostinelli ................... B29C 48/06 524/521 |
| 5,281,757 | A | * | 1/1994 | Marin .................... H01B 9/022 174/106 SC |
| 7,087,842 | B2 | * | 8/2006 | Belli ...................... H01B 7/288 174/113 R |
| 10,388,429 | B1 | * | 8/2019 | McNutt .................. H01B 11/22 |
| 10,529,465 | B1 | * | 1/2020 | Ku .......................... H01B 11/02 |
| 2009/0220817 | A1 | * | 9/2009 | Kato ....................... C08J 9/0061 428/626 |
| 2018/0047481 | A1 | * | 2/2018 | Dalin ................... H01B 7/2825 |
| 2021/0304921 | A1 | * | 9/2021 | Horton .................. H01B 7/288 |

OTHER PUBLICATIONS

International Search Report and Written Opinion of the International Saerching Authority; Application No. PCT/EP2020/064139; Completed: Jul. 6, 2020; dated Jul. 14, 2020; 15 Pages.

International Preliminary Report on Patentability; Application No. PCT/EP2020/064139; dated Jul. 26, 2021; 19 Pages.

Second Written Opinion of the International Searching Authority; Application No. PCT/EP2020/064139; dated Mar. 29, 2021; 7 pages.

* cited by examiner

Providing

HVDC POWER CABLE WITH WATER-BLOCKING CAPABILITY

TECHNICAL FIELD

The present disclosure generally relates to high voltage DC power cables.

BACKGROUND

Some high voltage DC power cables have non-solid conductors, in the following referred to as multi-wire conductors. Multi-wire conductors are made by stranding a plurality of wires. Such wires may for example have a circular or elliptical cross-section, or they may have other shapes, such as in the case of keystone or profiled conductors.

The filling grade of the wires is typically in the range of 92%-96%, with the lower figure being typical for stranded round wire conductors and the higher figure being typical for keystone conductors. Since the filling grade is not 100%, there is a risk that water may migrate longitudinally into the interstices between the wires for example after a cable fault.

High voltage DC power cables on the market today use water swelling tapes to prevent longitudinal migration of water after a cable fault or in the case of defects in the end caps during transport or installation of the cable, which may lead to water ingression. The water swelling tape may be provided between layers of the conductor wires and/or around the conductor.

WO 2016/206715 A1 discloses a power cable with a stranded conductor to which a semi-conducting conductor shield is applied. A layer of insulation, preferably polyethylene surrounds the conductor shield, and a semi-conducting insulation shield is arranged around the outside of the insulation. A filler material fills all spaces of the stranded conductor. The filler material is a compound of low molecular weight polyisobutylene rubber or a low molecular weight copolymer of isobutylene-isoprene rubber.

WO 2016/206715 A1 discloses a water blocking material in the conductor of an HVDC cable in the form of a yarn incorporated between the strands of the conductor. The yarn is laid mainly in the longitudinal direction with the same lay direction as the strands. Alternatively, the water blocking material could be in the form of a water absorbent powder or the powder could be included in the conductor by means of a tape comprising the powder.

One drawback with water swelling tapes is that they may release components that migrate into the solid insulation system of the power cable. These components could potentially contaminate the solid insulation system. In contrast to AC cables, it is especially important for high voltage DC cables that the solid insulation system is kept as contamination free as possible, to ensure a long lifetime of the power cable.

The present inventors have found that these issues start to become a problem for high voltage DC power cables operating at voltages of 320 kV or higher. The electric field across the insulation is in this case so high that the insulation material may be due to the contamination become conductive enough to increase the temperature of the insulation to undesirable levels at which it degrades over time.

SUMMARY

In view of the above, an object of the present disclosure is to provide a high voltage DC power cable which solves or at least mitigates existing problems of the state of the art.

There is hence provided a high voltage DC power cable designed for voltages of 320 kV or higher, comprising: a multi-wire conductor, an inner semiconducting layer arranged around the multi-wire conductor, the inner semiconducting layer forming a screen layer for the multi-wire conductor, a solid insulation system arranged around the inner semiconducting layer, and a water-blocking compound configured to restrict water migration into the high voltage DC power cable.

The water-blocking compound provides longitudinal water-tightness, preventing water to migrate into the high voltage DC power cable. This may be achieved without providing water swellable tape around the multi-wire conductor, or between layers of wires of the multi-wire conductor.

By achieving a water-blocking functionality without using water swellable tapes, which contain by-products from production that may migrate into the solid insulation system, the solid insulation system may be made free or essentially free of contaminants. Thereby, the performance of the solid insulation system and hence of the high voltage DC power cable may be improved.

That the high voltage DC power cable is designed for voltages of 320 kV or higher means that the solid insulation system is made of a material specifically configured to withstand voltage levels of 320 kV or higher and that the solid insulation system is dimensioned to handle these voltage levels.

The water-blocking compound may be configured to restrict water migration into the multi-wire conductor. The water-blocking compound may be configured to restrict water migration into interstices between the wires of the multi-wire conductor.

According to one embodiment the water-blocking compound is provided in interstices between the wires of the multi-wire conductor. Water is thereby not able to migrate longitudinally in between the wires.

According to one embodiment the water-blocking compound is provided radially outwards of and around the solid insulation system.

The high voltage DC power cable may comprise an outer semiconducting layer provided around the solid insulation system. The water-blocking compound may for example be provided on the external surface of the outer semiconducting layer.

The high voltage DC power cable may comprise screen wires arranged radially outwards of the outer semiconducting layer. The water-blocking compound may for example be provided between the screen wires and/or over the screen wires.

According to one example, the water-blocking compound may be provided in the interstices between the wires of the multi-wire conductor and radially outwards of and around the solid insulation system.

The water-blocking compound may be provided to obtain a filling grade of the multi-wire conductor in the range of 98%-100%, such as 99%-100%, such as over 99% to 100%, or even a 100% filling grade.

The water-blocking compound may be provided in interstices between the perimeter of the multi-wire conductor and the inner semiconducting layer.

The water-blocking compound may be hydrophobic.

The water-blocking compound may contain a hydrophilic swelling agent.

According to one embodiment the water-blocking compound comprises a hydrocarbon-based component or a silica-based component.

The water-blocking compound may be a liquid, a solid, a gel or a paste.

According to one embodiment the water-blocking compound is a liquid with a viscosity greater than 20 Pa·s or a solid with Shore D less than 65, at a temperature of 20° C.

According to one embodiment the solid insulation system is composed of an electrically insulating material which has an electrical conductivity of at most 1000 fS/m, at most 100 fS/m, or at most 10 fS/m measured at nominal voltage at a temperature of 20° C. These characteristics are measured on the electrically insulating material of the high voltage DC power cable.

The higher the electrical conductivity of the electrically insulating material the smaller the influence of a water-blocking swelling tape, because electrically insulating materials with a high electrical conductivity will carry charges under high enough electrical fields and thus heat the electrically insulating material even without contamination. Electrically insulating materials with a higher electrical conductivity are therefore less sensitive to contamination than electrically insulating materials with lower electrical conductivity.

Because of the water-blocking compound, which reduces the risk of contamination of the solid insulation system, electrically insulating materials with lower electrical conductivity, preferably not higher than 200 fS/m such as not higher than 150 fS/m, may be used in the high voltage DC power cable.

According to one embodiment the solid insulation system is composed of an electrically insulating material which has the inherent property that a non-heat treated 1 mm thick press-moulded plate made from the electrically insulating material has an electrical conductivity of at most 50 fS/m measured after 24 hours at 70° C. and an electric field of 30 kV/mm applied across the thickness dimension of the press-moulded plate.

The measurement of the electrical conductivity is thus performed after the press-moulded plate has been continuously subjected to an electric field of 30 kV/mm at 70° C. for 24 hours.

The press-moulded plate may for example be made from granules composed of the electrically insulating material, which are placed in a mould to form the plate.

The solid insulation system may comprise a thermoset such as cross-linked polyethylene (XLPE) or a thermoplastic such as polypropylene. The solid insulation system comprising polypropylene may according to one example not be cross-linked.

According to one embodiment the water-blocking compound is electrically conducting. Electrical contact is hence provided between the layers separated by the compound. There may for example be attained an electrical contact between the multi-wire conductor and the inner semiconducting layer, or between an outer semiconducting layer and screen wires. In this manner, there will be no or essentially no potential difference between e.g., the wires of the multi-wire conductor and the inner semiconducting layer, or between the outer semiconducting layer and the screen wires.

According to one embodiment the water-blocking compound comprises a carbon-based component which provides the electric conductivity of the water-blocking compound.

According to one embodiment the carbon-based component is graphite.

One embodiment comprises an electrically conducting or an electrically non-conducting tape wound around the multi-wire conductor and arranged between the multi-wire conductor and the inner semiconducting layer.

The tape may prevent the water-blocking medium to contaminate the cable production line during manufacturing of the high voltage DC power cable.

The tape may also prevent accumulation of water-blocking compound, which thereby could turn into lumps that protrude into the inner semiconducting layer and the solid insulation system.

The tape may according to one example have water-blocking capability.

The tape does preferably not contain any swelling agent.

According to one embodiment the tape is in direct contact with the multi-wire conductor and/or the water-blocking compound and with the inner semiconducting layer.

According to one embodiment the multi-wire conductor is formed by a plurality of layers of wires, wherein the water-blocking compound is provided in interstices between each layer of wires.

According to one embodiment the water-blocking compound is provided on an outermost layer of wires of the multi-wire conductor.

According to one embodiment the water-blocking compound comprises polybutadiene, an antioxidant, and graphite. This compound does not contaminate the solid insulation system.

According to one embodiment the solid insulation system is partially cross-linked so that it only passes a hot set test according to IEC 60811-507 up to 50% of the load specified by IEC 60811-507.

The load specified by IEC 60811-507 is 20 N/cm$^2$.

According to one embodiment the solid insulation system is partially cross-linked so that it only passes a hot set test according to IEC 60811-507 up to 40%, such as up to 30%, such as up to 25%, of the load specified by IEC 60811-507.

According to one embodiment the solid insulation system comprises a thermoplastic polypropylene-based material.

According to one embodiment the water-blocking compound is a water-blocking or water-absorbing compound.

The high voltage DC power cable may be a land cable or a submarine cable.

There is according to a second aspect of the present disclosure provided a method of manufacturing a high voltage DC power cable according to the first aspect, wherein the method comprises: providing the water-blocking compound internally in the high voltage DC power cable to restrict water migration into the high voltage DC power cable.

The method may for example comprise: stranding a plurality of wires to form the multi-wire conductor, wherein the stranding involves providing the water-blocking compound between each layer of wires, and extruding the inner semiconducting layer and the solid insulation system onto the multi-wire conductor.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
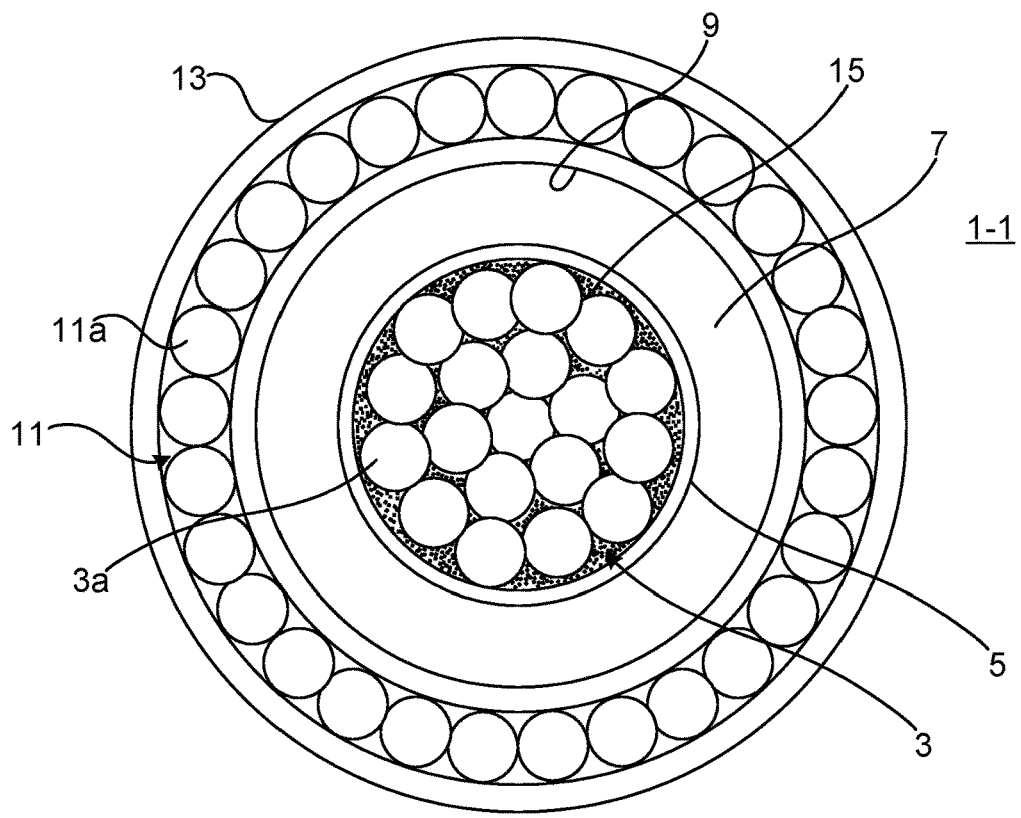
FIG. 1 schematically shows a cross-section of an example of a high voltage DC power cable.

FIG. 1 schematically shows a cross-section of an example of a high voltage DC (HVDC) power cable 1-1. The exemplified HVDC power cable 1-1 is a land cable but could alternatively be a submarine power cable. In the latter case, the general structure of the HVDC power cable would be somewhat different, as it would be configured for underwater use and e.g., comprise a water-blocking sheath and optionally armouring. The HVDC power cable 1-1 is designed to have a voltage rating equal to or greater than 320 kV.

The HVDC power cable 1-1 comprises a multi-wire conductor 3. The multi-wire conductor 3 comprises a plurality of wires 3a. The wires 3a are arranged in a stranded configuration. The multi-wire conductor 3 has interstices between the wires 3a. The fill-factor of the multi-wire conductor 3 as provided by the wires may for example be in the range 92-96%. This means that the conductor material fills 92-96% of the cross-sectional area of the multi-wire conductor 3.

In the present example, the stranded wires 3a are rounded wires and the multi-wire conductor 3a is a stranded round conductor. The multi-wire conductor could alternatively for example be a keystone or profiled conductor, or a segmental or Milliken conductor.

The exemplified HVDC power cable 1-1 comprises an inner semiconducting layer 5. The inner semiconducting layer 5 is provided around the multi-wire conductor 3. The inner semiconducting layer 5 acts as a conductor screen. The inner semiconducting layer 5 hence forms a screen layer for the multi-wire conductor 3. The exemplified inner semiconducting layer 5 may be polymer-based and may comprise a conductive component such as carbon black.

The HVDC power cable 1-1 comprises a solid insulation system 7. The solid insulation system 7 is an electrical insulation system. The solid insulation system 7 is provided around the inner semiconducting layer 5. The solid insulation system 7 is hence arranged radially outwards of the inner semiconducting layer 5.

The solid insulation system 7 is composed of, or comprises, an electrically insulating material which has an electrical conductivity of for example at most 1000 femto Siemens (fS)/m, such as at most 100 fS/m, or at most 10 fS/m, measured at nominal voltage at a temperature of 20° C.

The solid insulation system 7 may be partially cross-linked so that it only passes a hot set test according to IEC 60811-507 up to 50% of the load specified by IEC 60811-507. The solid insulation system 7 thus fails the hot set test according to IEC 60811-507 when the load is larger than 50% of the load specified by IEC 60811-507.

The standard IEC 60811-507 referred to is Edition 1.0 of 2012-03.

The solid insulation system 7 may be partially cross-linked so that it only passes a hot set test according to IEC 60811-507 up to 40%, such as up to 30%, such as up to 25% of the load specified by IEC 60811-507.

An example of a compound with this property is LS4258DCE by *Borealis*.

The solid insulation system 7 may be polymer-based. The solid insulation system 7 may for example comprise cross-linked polyethylene, or polypropylene.

The HVDC power cable 1-1 comprises an outer semiconducting layer 9. The outer semiconducting layer 9 is provided around the solid insulation system 7. The outer semiconducting layer 9 is hence arranged radially outwards of the solid insulation system 7. The solid insulation system 7 is sandwiched between the inner semiconducting layer 5 and the outer semiconducting layer 9.

The outer semiconducting layer 9 acts as an insulation screen for the solid insulation system 7. The exemplified outer semiconducting layer 9 may be polymer-based and may comprise a conductive component such as carbon black.

The HVDC power cable 1-1 may comprise a metallic screen 11. The metallic screen 11 may be provided around the outer semiconducting layer 9. The metallic screen 11 may for example comprise copper. The metallic screen 11 may comprise a plurality of screen wires 11a. The screen wires 11a may be distributed along the perimeter of the outer semiconducting layer 9. The screen wires 11a may be helically wound around the outer semiconducting layer 9. The screen wires 11a may for example comprise copper.

The HVDC power cable 1-1 has an outer serving or sheath 13 covering the metallic screen 11. The outer serving or sheath 13 forms the outermost layer of the HVDC power cable 1-1. The outer serving or sheath 13 may for example comprise a polymeric material.

The HVDC power cable 1-1 comprises a water-blocking compound 15. The water-blocking compound 15 is arranged to restrict water migration into the HVDC power cable 1-1.

FIG. 1 shows one example of the configuration of the water-blocking compound 15 in the HVDC power cable 1-1. The water-blocking compound 15 is arranged between the interstices of the wires 3a. The wires 3a are arranged in layers, and the interstices in and between all layers may be filled with the water-blocking compound 15. All the interstices between the wires 3a of the multi-wire conductor 3 are hence filled with the water-blocking compound 15. The water-blocking compound 15 is arranged radially outside of the multi-wire conductor 3, on the outer surface of the outermost layer of the wires 3a. Water is hence prevented to migrate longitudinal in the interstices of the multi-wire conductor 3.

The water-blocking compound 15 may for example be a liquid. The water-blocking compound 15 may have a viscosity equal to or greater than 20 Pa*s. The water-blocking compound 15 may according to one example be a solid with a Shore D less than 65 at a temperature of 20° C.

The water-blocking compound 15 may be electrically conducting. The water-blocking compound 15 may for example comprise a carbon-based component which makes the water-blocking compound 15 electrically conducting. The carbon-based component may for example be graphite.

The water-blocking compound 15 may be hydrocarbon-based on silica-based. The water-blocking compound 15 may comprise a hydrocarbon-based component or a silica-based component. The water-blocking compound 15 may for example comprise polybutadiene, an antioxidant, and graphite.

The water-blocking compound 15 may be hydrophobic or hydrophilic. The water-blocking compound 15 may according to one example comprise a swelling agent.

Figure 2:
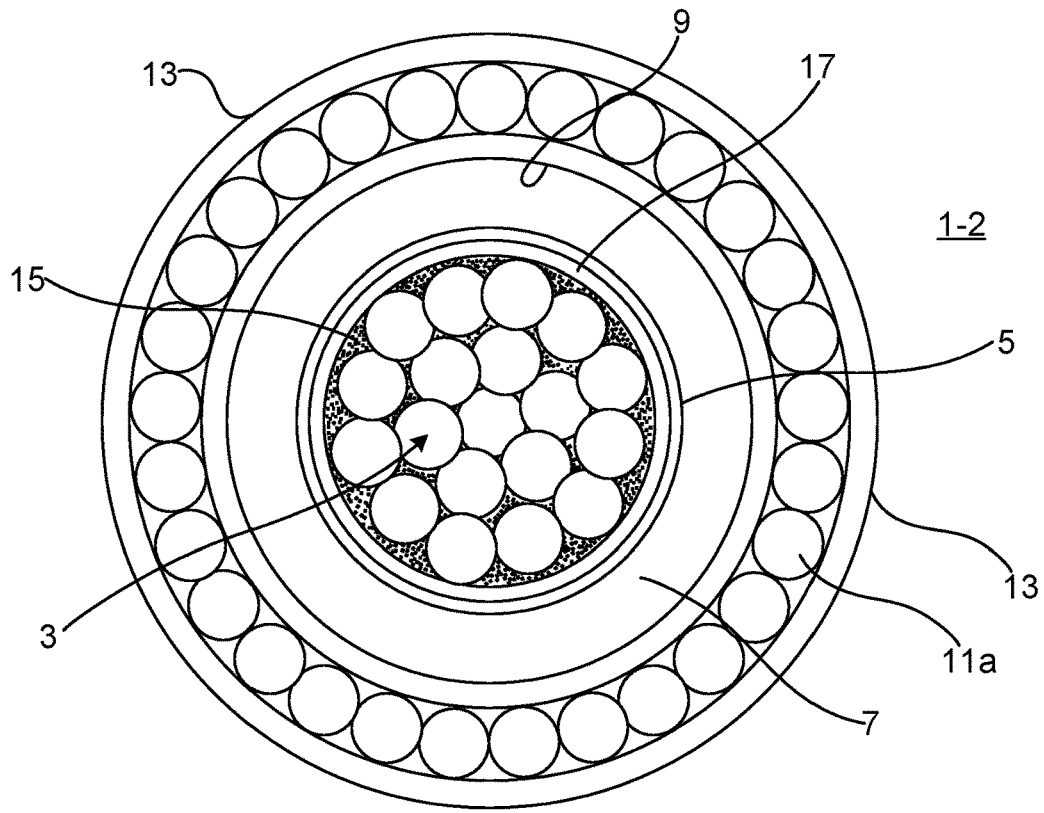
FIG. 2 schematically shows a cross-section of another example of a high voltage DC power cable.

FIG. 2 shows a cross-section of another example of an HVDC power cable 1-2. The general structure of the HVDC power cable 1-2 is similar to the HVDC power cable 1-1. The HVDC power cable 1-2 however comprises a tape 17. The tape 17 is wound around the multi-wire conductor 3. The tape 17 may be wound around the multi-wire conductor 3 along the entire length of the multi-wire conductor 3. The tape 17 may be electrically conducting or electrically non-conducting/electrically insulating. The tape 17 may for example comprise a polymer. The tape 17 is arranged between the multi-wire conductor 3 and the inner semiconducting layer 5. The tape 17 may be in direct contact with the inner surface of the inner semiconducting layer 5. The tap 17 may be in direct contact with the multi-wire conductor 3 and/or with the water-blocking compound 15.

Figures 3, 4:
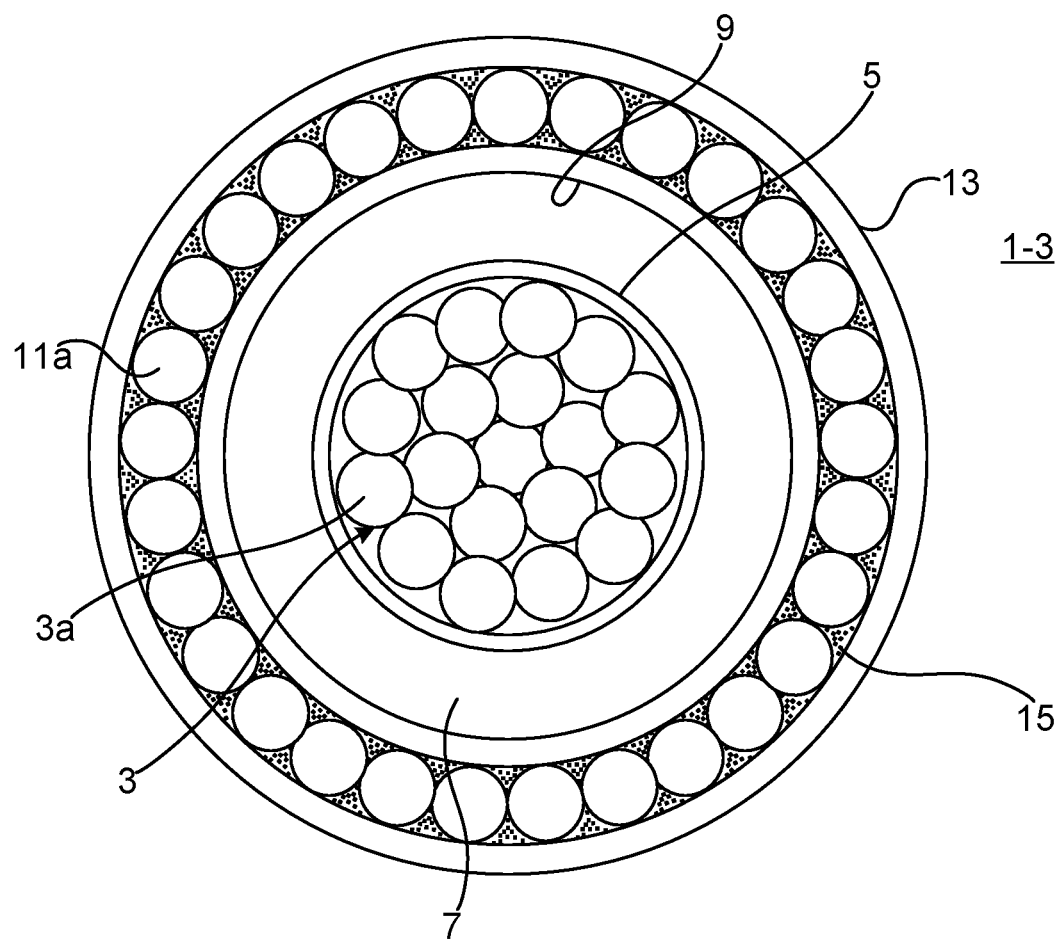
FIG. 3 schematically shows a cross-section of yet another example of a high voltage DC power cable.
FIG. 4 is a flowchart of a method of manufacturing a high voltage DC power cable.

FIG. 3 shows a cross-section of an example of an HVDC power cable 1-3. The structure of the HVDC power cable 1-3 is similar to the HVDC power cable 1-1. The HVDC power cable 1-2 has the water-blocking compound 15 provided in the interstices between the screen wires 11a. The water-blocking compound 15 is also provided on the outer surface of the screen wires 11a.

The water-blocking compound 15 may in this example optionally also be provided in the interstices between the wires 3a of the multi-wire conductor 3.

The water-blocking compound 15 could according to one variation be provided directly on the outer surface of the outer semiconducting layer 9 instead of around/between the interstices of the screen wires 11a.

The HVDC power cable 1-3 may according to one variation include a tape wound around the outer semiconducting layer. The tape may for example be wound around the screen wires 11a. The water-blocking compound may according to one example at least partly be in direct contact with the tape.

FIG. 4 shows a flowchart of a method of manufacturing an HVDC power cable such as HVDC power cable 1-1 to 1-3. The method in general comprises providing the water-blocking compound 15 internally in the HVDC power cable 1-1 to 1-3 to restrict water migration into the HVDC power cable 1-1 to 1-3.

For the HVDC power cables 1-1 and 1-2, the providing of the water-blocking compound 15 internally comprises a) stranding the plurality of wires 3a to form the multi-wire conductor 3. The stranding involves providing the water-blocking compound 15 between each layer of wires 3a. This may be achieved during the stranding process, as the stranding machine strands the wires 3a layer by layer. The stranding may furthermore involve providing the water-blocking compound 15 on the outermost layer, on the outer surface, of the wires 3a. The method may further comprise b) extruding the inner semiconducting layer 5 and the solid insulation system 7 onto the multi-wire conductor 3, which has had its interstices/spaces between the wires 3a provided with the water-blocking compound 15. The outer semiconducting layer 9 is extruded on the solid insulation system 7. The extrusion may be a triple-extrusion process, in which the inner semiconducting layer 5, the solid insulation system 7 and the outer semiconducting layer 9 are co-extruded.

For the HVDC cable 1-3, the providing of the water-blocking compound 15 involves providing it onto and in between the screen wires 11a.

All the HVDC power cables 1-1 to 1-3 disclosed herein may be free of water swelling tape.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A high voltage DC power cable designed for voltages of 320 kV or higher, comprising:
   a multi-wire conductor,
   an inner semiconducting layer arranged around the multi-wire conductor, the inner semiconducting layer forming a screen layer for the multi-wire conductor,
   a solid insulation system arranged around the inner semiconducting layer, and
   a water-blocking compound configured to restrict water migration into the high voltage DC power cable,
   wherein the water-blocking compound is a liquid with a viscosity greater than 20 Pa·s at a temperature of 20° C.,
   wherein the water-blocking compound is electrically conducting, wherein the water-blocking compound includes a carbon-based component which provides the electric conductivity of the water-blocking compound, wherein the carbon-based component is graphite, wherein the water-blocking compound includes polybutadiene, and an antioxidant.

2. The high voltage DC power cable as claimed in claim 1, wherein the water-blocking compound is provided in interstices between the wires of the multi-wire conductor.

3. The high voltage DC power cable as claimed in claim 2, wherein the water-blocking compound comprises a hydrocarbon-based component or a silica-based component.

4. The high voltage DC power cable as claimed in claim 2, wherein the solid insulation system is composed of an electrically insulating material which has an electrical conductivity of at most 1000 fS/m, at most 100 fS/m, or at most 10 fS/m measured at nominal voltage at a temperature of 20° C.

5. The high voltage DC power cable as claimed in claim 2, comprising an electrically conducting or an electrically non-conducting tape wound around the multi-wire conductor and arranged between the multi-wire conductor and the inner semiconducting layer.

6. The high voltage DC power cable as claimed in claim 2, wherein the water-blocking compound is provided on an outermost layer of wires of the multi-wire conductor.

7. The high voltage DC power cable as claimed in claim 1, wherein the water-blocking compound is provided radially outwards of and around the solid insulation system.

8. The high voltage DC power cable as claimed in claim 1, wherein the water-blocking compound comprises a hydrocarbon-based component or a silica-based component.

9. The high voltage DC power cable as claimed in claim 1, wherein the solid insulation system is composed of an electrically insulating material which has an electrical conductivity of at most 1000 fS/m, at most 100 fS/m, or at most 10 fS/m measured at nominal voltage at a temperature of 20° C.

10. The high voltage DC power cable as claimed in claim 1, wherein the solid insulation system is composed of an electrically insulating material which has the inherent property that a non-heat treated 1 mm thick press-moulded plate made from the electrically insulating material has an electrical conductivity of at most 50 fS/m measured after 24 hours at 70° C. and an electric field of 30 kV/mm applied across the thickness dimension of the press-moulded plate.

11. The high voltage DC power cable as claimed in claim 1, comprising an electrically conducting or an electrically non-conducting tape wound around the multi-wire conductor and arranged between the multi-wire conductor and the inner semiconducting layer.

12. The high voltage DC power cable as claimed in claim 11, wherein the tape is in direct contact with the multi-wire conductor and/or the water-blocking compound and with the inner semiconducting layer.

13. The high voltage DC power cable as claimed in claim 1, wherein the multi-wire conductor is formed by a plurality of layers of wires, wherein the water-blocking compound is provided in interstices between each layer of wires.

14. The high voltage DC power cable as claimed in claim 1, wherein the water-blocking compound is provided on an outermost layer of wires of the multi-wire conductor.

15. The high voltage DC power cable as claimed in claim 1, wherein the solid insulation system is partially cross-linked so that it only passes a hot set test according to IEC 60811-507 up to 50% of the load specified by IEC 60811-507.

16. The high voltage DC power cable as claimed in claim 15, wherein the solid insulation system is partially cross-linked so that it only passes a hot set test according to IEC 60811-507 up to 40%, such as up to 30%, such as up to 25%, of the load specified by IEC 60811-507.

17. The high voltage DC power cable as claimed in claim 1, wherein the solid insulation system comprises a thermoplastic polypropylene-based material.

\* \* \* \* \*